United States Patent
Chevion et al.

(10) Patent No.: US 7,529,542 B1
(45) Date of Patent: May 5, 2009

(54) METHOD OF ESTABLISHING COMMUNICATION BETWEEN TWO OR MORE REAL WORLD ENTITIES AND APPARATUSES PERFORMING THE SAME

(75) Inventors: Dan Shmuel Chevion, Haifa (IL); Ron Sivan, Haifa (IL); Sima Nadler, Kochav Yair (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/106,795

(22) Filed: Apr. 21, 2008

(51) Int. Cl.
*H04M 3/42* (2006.01)
*H04M 3/493* (2006.01)
*H04W 24/00* (2006.01)
*H04M 1/66* (2006.01)

(52) U.S. Cl. ............ 455/414.1; 455/414.2; 455/456.1; 455/411

(58) Field of Classification Search ............. 455/41.2, 455/41.3, 410, 411, 414.1, 414.2, 421, 422.1, 455/440, 456.1–456.3, 457, 7, 11.1
See application file for complete search history.

(56) References Cited

U.S. PATENT DOCUMENTS

| | | | |
|---|---|---|---|
| 4,837,568 A | 6/1989 | Snaper | |
| 5,929,848 A | 7/1999 | Albukerk et al. | |
| 6,122,520 A | 9/2000 | Want et al. | |
| 6,173,239 B1 | 1/2001 | Ellenby | |
| 6,297,737 B1 | 10/2001 | Irvin | |
| 6,396,475 B1 | 5/2002 | Ellenby et al. | |
| 7,058,356 B2 | 6/2006 | Slotznick | |
| 7,158,756 B2 * | 1/2007 | Palin et al. ................ | 455/41.2 |
| 7,299,256 B2 | 11/2007 | Pradhan et al. | |
| 2004/0103043 A1 | 5/2004 | Reade et al. | |
| 2004/0203376 A1 | 10/2004 | Phillipps | |
| 2006/0050052 A1 | 3/2006 | Mekenkamp et al. | |
| 2006/0161379 A1 | 7/2006 | Ellenby et al. | |
| 2006/0241864 A1 | 10/2006 | Rosenberg | |
| 2006/0256007 A1 | 11/2006 | Rosenberg | |
| 2006/0256008 A1 | 11/2006 | Rosenberg | |
| 2006/0259574 A1 | 11/2006 | Rosenberg | |
| 2007/0273583 A1 | 11/2007 | Rosenberg | |
| 2007/0298715 A1 | 12/2007 | Blight et al. | |
| 2008/0051033 A1 | 2/2008 | Hymes | |

FOREIGN PATENT DOCUMENTS

WO 9317504 9/1993
WO 02073818 9/2002

* cited by examiner

*Primary Examiner*—Eugene Yun
(74) *Attorney, Agent, or Firm*—Wenderoth, Lind & Ponack, L.L.P.

(57) ABSTRACT

Establishing communication between people when face-to-face communication is difficult by pointing a portable device in a direction of a target and recording a position and orientation of the portable device and by recording a distance between the portable device and the target. Further, this communication is established by calculating a location of the target based on the recorded position, orientation, and distance and broadcasting, via the portable device, a message including the calculated location of the target. Moreover, this communication is established when the target receiving the message, compares the calculated location of the target with an actual position of the target to determine whether the target that received the initiation message is within a predetermined proximity of the calculated location of the target. If the receiving target is within the predetermined proximity of the intended target, a reply is transmitted to the portable device to initiate handshaking.

1 Claim, 3 Drawing Sheets

METHOD OF ESTABLISHING COMMUNICATION BETWEEN TWO OR MORE REAL WORLD ENTITIES AND APPARATUSES PERFORMING THE SAME

BACKGROUND OF THE INVENTION

1. Field of the Invention

The present invention relates to a method of establishing communication between two or more real world entities. More specifically, the present invention relates to a method of establishing communication between a portable device and stationary and/or portable hotspots.

2. Description of the Related Art

Humans are accustomed to two modes of communication. These two modes of communication include face-to-face communication and remote communication. Humans in close proximity generally initiate and conduct face-to-face communication in an informal manner. This informal face-to-face communication is conducted by observing local customs. Remote communication between humans who are not in close proximity to each other is conducted using well known technologies such as the telephone, cellular phone, instant messaging, video conferencing, email, etc.

These technologies used for conducting remote communication require that one or both of the communicating parties initiate the communication by utilizing a known point of contact of the other party (e.g., telephone number, email address, etc.)

These two modes of communication do not provide an easy method of establishing communication between people that can see each other but are too far away to communicate face-to-face or are in an environment that is too noisy to communicate face-to-face (e.g., communicating with a driver of a car in the next lane, communicating with a person across the street, or communicating with a store-front across the street).

In order to address the above-mentioned problem, a new mode of communication is described below. This new mode includes establishing communication by utilizing, for example, modern hand-held devices such as PDAs, mobile phones, navigation aids, in-vehicle devices, and so on.

SUMMARY OF THE INVENTION

In view of the above-mentioned problems, an embodiment of this invention provides a method of establishing communication between (i) two people, or (ii) a person and another entity, of which face-to-face communication is difficult or impossible.

An embodiment of this invention may include establishing and conducting communication between a portable device and at least one of a stationary hotspot and a non-stationary (i.e., portable) hotspot by pointing the portable device in a general direction of a target hotspot being at least one of the stationary hotspot and the non-stationary hotspot, recording, via the portable device, a position (e.g., geographical position) of the portable device, an orientation (e.g., north, south, east, west) of the portable device, and a distance between the target hotspot and the portable device, calculating, via the portable device, a location of the target hotspot based on the recorded position, orientation, and distance, and broadcasting, via the portable device, an initiation message to initiate communication with the target hotspot. The initiation message includes an identification of the portable device from which the initiation message was broadcast and includes the calculated location of the target hotspot.

Further, an embodiment of this invention may include receiving, via a hotspot within a receiving proximity of the portable device, the broadcast initiation message, and comparing, via the hotspot that received the broadcast initiation message, the calculated location of the target hotspot included in the broadcast initiation message with a position calculated by the hotspot that received the broadcast initiation message to determine whether or not the hotspot that received the broadcast initiation message is within a predetermined proximity of the calculated location of the target hotspot broadcast via the portable device. In addition, according to this method, if a hotspot that received the initiation message determines itself to be within the predetermined proximity of the portable device, a reply message is transmitted to the portable device (the reply message identifies the hotspot as the target hotspot), handshaking is conducted by exchanging encryption keys between the identified target hotspot and the portable device, and upon completing the handshaking, a free exchange of information is conducted between the portable device and the identified target hotspot.

Furthermore, additional embodiments of the present invention can be directed to a system including a portable device and a hotspot apparatus, a portable device, or a hotspot apparatus. In addition, the present invention can also be implemented as a program causing a computer to execute the above-described steps. The program can be distributed via a computer-readable storage medium such as a CD-ROM.

Additional features and advantages are described herein, and will be apparent from, the following Detailed Description and the figures.

DETAILED DESCRIPTION OF THE INVENTION

The following detailed description refers to the accompanying drawings. Although the description includes exemplary implementations, other implementations are possible and changes may be made to the implementations described without departing from the spirit and scope of the invention. The following detailed description and the accompanying drawings do not limit the invention.

Figure 1:
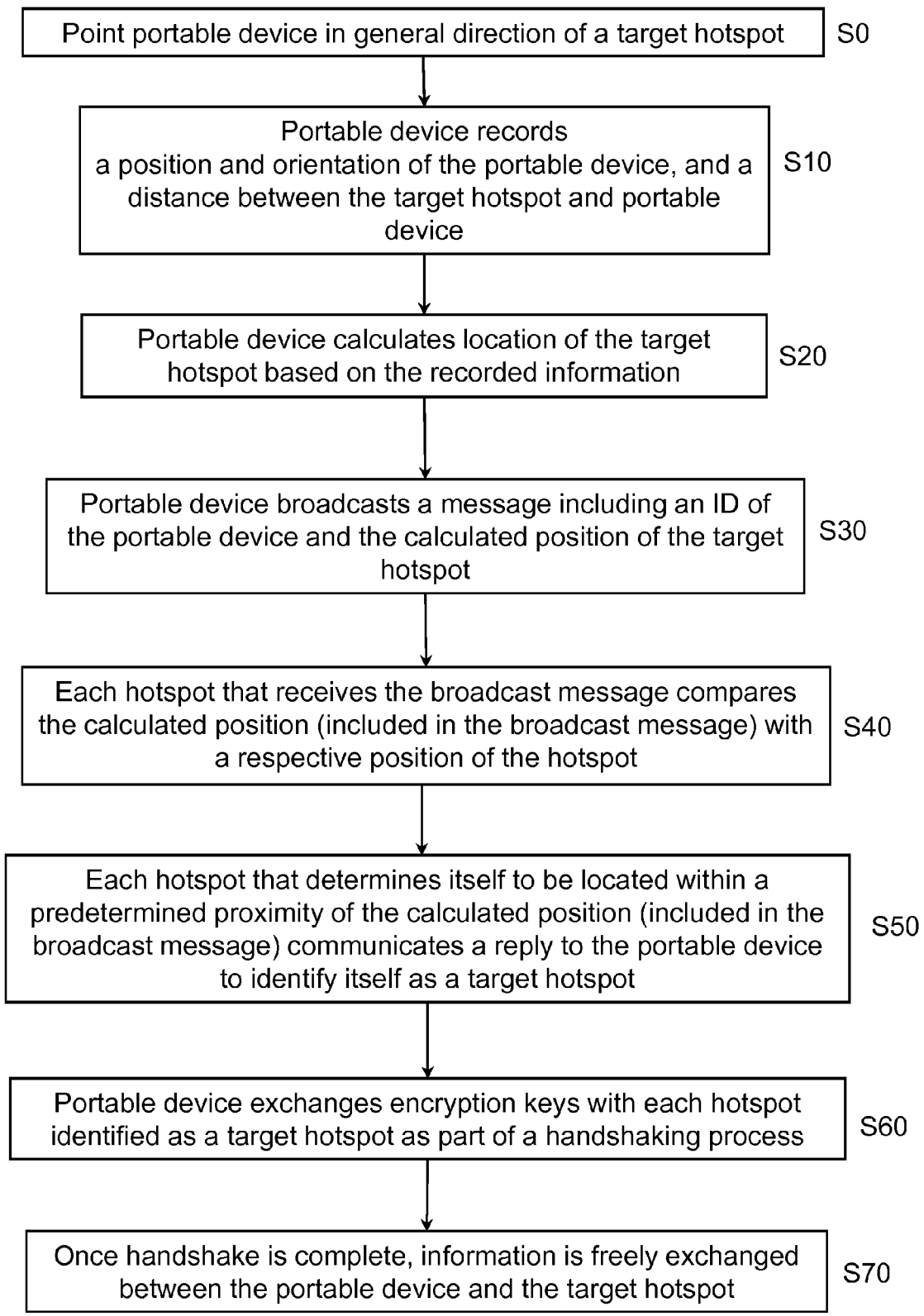
FIG. 1 is a flow chart illustrating method steps included in an embodiment of the invention.
Figure 2:
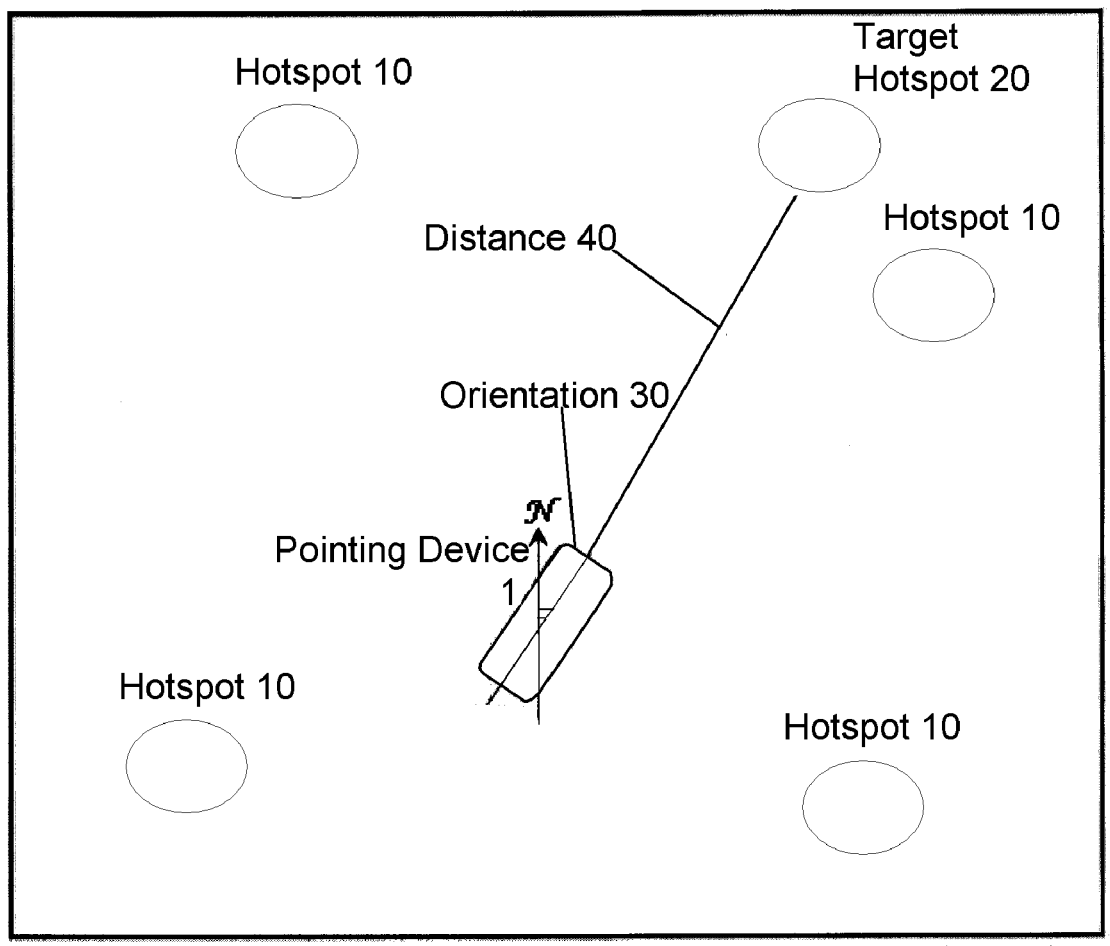
FIG. 2 illustrates a position of a portable device, an orientation of the portable device in relation to a target hotspot, and a distance between the portable device and the target hotspot.
Figure 3:
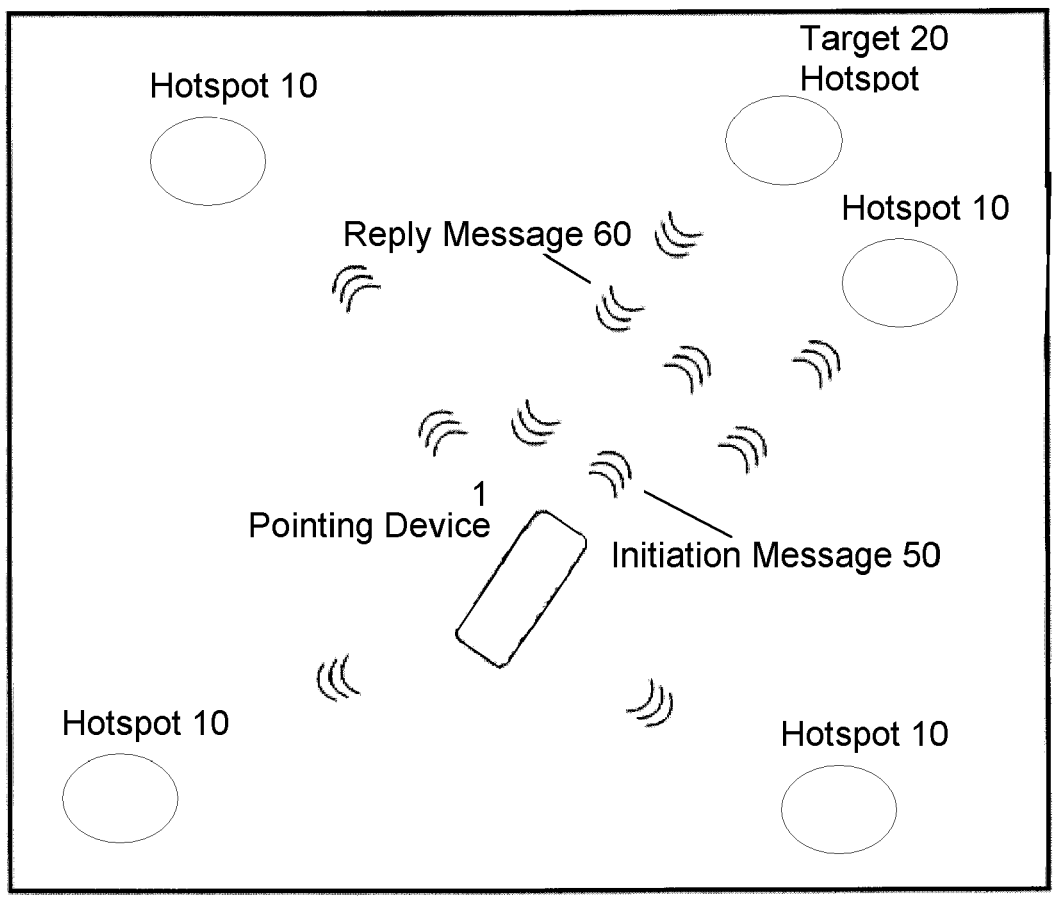
FIG. 3 illustrates broadcasting an initiation message from the pointing device and receiving a reply message sent from the target hotspot.

As illustrated in FIGS. 1-3, an embodiment of this invention includes pointing a portable device 1 in a general direction of a target hotspot 20 (S0). In addition, either at the direction of a user of the portable device 1 or upon automatic initiation by the portable device 1, the portable device 1 records its position (e.g., GPS location) and orientation 30 (e.g., reading from a magneto-resistive element), and records a distance 40 between the portable device and the target hotspot 20 using, for example, laser or ultrasound rangefinding technologies (S10).

Next, the portable device 1 calculates the location of the target hotspot 20 based on the recorded information (S20), and broadcasts an initiation message 50 including an identification (ID) of the portable device 1 and the calculated location of the target hotspot 20 (S30).

Each hotspot 10/20 which receives the initial message 50 and is within a predetermined proximity of the portable device 1 compares the calculated location (included in the initial message broadcast from the portable device 1) with a location of the hotspot itself 10/20 (S40). The location of each hotspot 10/20 is known because each hotspot 10/20 is aware of its own position. Preferably, if the hotspot 10/20 is portable, the position of the hotspot 10/20 is periodically determined by the hotspot 10/20.

Using this comparison, each hotspot 10/20 determines whether or not it is within a predetermined proximity of the calculated location, and then transmits a reply message 60 to the portable device 1 if the respective hotspot 10/20 is determined to be within the predetermined proximity (S50) and the transmission of the reply message 60 is authorized by a user/owner of the hotspot 10/20. This reply message 60 from the hotspot 10/20 identifies the hotspot 10/20 as a target hotspot 20 to the portable device 1. Accordingly, even though multiple hotspots 10/20 might be within a broadcast range of the portable device 1 and, thus, receive the initiation message from the portable device, only hotspots 10/20 that are within a desired proximity of the calculated location will identify themselves as a target hotspot 20.

Once a hotspot 10/20 is identified as a target hotspot 20, the portable device 1 and the identified target hotspot 20 conduct handshaking by, for example, exchanging encryption keys (S60). Finally, once the handshaking is complete, information is freely exchanged between the portable device 1 and the target hotspot 20 (S70).

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claim.

The invention claimed is:

1. A method of establishing communication between a portable device and at least one of a stationary hotspot and a portable hotspot, said method comprising:

pointing the portable device in a direction of a target hotspot being one of the stationary hotspot and the portable hotspot;

recording, via the portable device, (i) a position of the portable device, (ii) an orientation of the portable device, and (iii) a distance between the portable device and the target hotspot;

calculating, via the portable device, a location of the target hotspot based on the position, orientation, and distance recorded by said recording;

broadcasting, via the portable device, an initiation message for establishing communication with the target hotspot, the initiation message including an identification of the portable device and the location of the target hotspot calculated by said calculating;

receiving, via a hotspot within a receiving proximity of the portable device, the initiation message broadcast by said broadcasting;

comparing, via the hotspot that received the initiation message broadcast by said broadcasting, the calculated location of the target hotspot included in the initiation message with a position of the hotspot that received the initiation message to determine whether or not the hotspot that received the initiation message is within a predetermined proximity of the calculated location of the target hotspot broadcast via the portable device, the position of the hotspot that received the initiation message being calculated by the hotspot that received the initiation message;

if the hotspot that received the initiation message determines that it is located within the predetermined proximity of the calculated location of the target hotspot broadcast via the portable device, transmitting a reply message to the portable device, the reply message identifying the hotspot as the target hotspot;

conducting handshaking by exchanging encryption keys between the identified target hotspot and the portable device; and upon completing said handshaking, freely exchanging information between the portable device and the identified target hotspot.

\* \* \* \* \*